US010614313B2

(12) United States Patent
Catalano et al.

(10) Patent No.: US 10,614,313 B2
(45) Date of Patent: Apr. 7, 2020

(54) RECOGNITION AND VALUATION OF PRODUCTS WITHIN VIDEO CONTENT

(71) Applicant: International Business Machines Corporation, Armonk, NY (US)

(72) Inventors: Pasquale A. Catalano, Wallkill, NY (US); Andrew G. Crimmins, Montrose, NY (US); Arkadiy O. Tsfasman, Wappingers Falls, NY (US); John S. Werner, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 15/838,736

(22) Filed: Dec. 12, 2017

(65) Prior Publication Data

US 2019/0180108 A1   Jun. 13, 2019

(51) Int. Cl.
*G06K 9/00* (2006.01)
*H04N 21/234* (2011.01)
*H04N 21/81* (2011.01)
*G06Q 30/02* (2012.01)
*H04N 21/439* (2011.01)

(52) U.S. Cl.
CPC ..... *G06K 9/00744* (2013.01); *G06Q 30/0273* (2013.01); *H04N 21/23418* (2013.01); *H04N 21/4394* (2013.01); *H04N 21/812* (2013.01)

(58) Field of Classification Search
CPC ........... G06K 9/00744; G06Q 20/0273; H04N 21/23418; H04N 21/4394; H04N 21/812
See application file for complete search history.

(56) References Cited

U.S. PATENT DOCUMENTS

| 7,207,053 | B1 * | 4/2007 | Asmussen | G06Q 30/02 348/E7.063 |
| 8,191,089 | B2 * | 5/2012 | Liao | G06Q 30/02 725/32 |
| 8,312,486 | B1 * | 11/2012 | Briggs | H04N 21/435 725/32 |
| 8,458,053 | B1 * | 6/2013 | Buron | G06Q 30/06 705/14.4 |
| 8,949,889 | B1 * | 2/2015 | Erdmann | G06Q 30/00 725/22 |

(Continued)

*Primary Examiner* — Nathan J Flynn
*Assistant Examiner* — Tung T Trinh
(74) *Attorney, Agent, or Firm* — Cantor Colburn LLP; Teddi Maranzano

(57) ABSTRACT

Embodiments of the invention include method, systems and computer program products for identifying one or more products, brands and/or green screen objects within video content and valuations thereof. The computer-implemented method includes receiving, by a processor, video content. The processor analyzes the video content to identify one or more products, brands and/or green screen objects within the video content. The processor further assigns a product placement score to each of the identified one or more products, brands and/or green screen objects. The processor further outputs a dataset including product placement scores assigned to each of the identified one or more products, brands and/or green screen objects, wherein the dataset provides a valuation for each of the identified one or more products, brands and/or green screen objects based on an associated product placement score.

17 Claims, 5 Drawing Sheets

(56) References Cited

U.S. PATENT DOCUMENTS

| | | | |
|---|---|---|---|
| 9,058,764 B1* | 6/2015 | Persson | G09G 5/14 |
| 9,508,080 B2* | 11/2016 | Hoelz | G06Q 30/02 |
| 9,532,086 B2 | 12/2016 | Byers | |
| 2003/0028873 A1* | 2/2003 | Lemmons | H04N 7/17318 |
| | | | 725/36 |
| 2004/0194128 A1* | 9/2004 | McIntyre | H04N 5/272 |
| | | | 725/32 |
| 2007/0214476 A1* | 9/2007 | Zalewski | H04N 7/17318 |
| | | | 725/32 |
| 2008/0033801 A1* | 2/2008 | McKenna | G06Q 30/02 |
| | | | 705/14.4 |
| 2008/0033804 A1* | 2/2008 | McKenna | G06Q 30/02 |
| | | | 705/14.4 |
| 2009/0249386 A1* | 10/2009 | Shan | G06Q 30/02 |
| | | | 725/32 |
| 2009/0327346 A1* | 12/2009 | Teinila | G06Q 30/02 |
| 2010/0313218 A1* | 12/2010 | Niemeijer | H04N 21/812 |
| | | | 725/35 |
| 2010/0318406 A1* | 12/2010 | Zazza | G06Q 30/02 |
| | | | 705/14.42 |
| 2011/0125573 A1* | 5/2011 | Yonezaki | G06Q 30/02 |
| | | | 705/14.48 |
| 2011/0219402 A1* | 9/2011 | Candelore | H04N 7/025 |
| | | | 725/34 |
| 2012/0030012 A1* | 2/2012 | Fisher | G06Q 30/0241 |
| | | | 705/14.46 |
| 2012/0044250 A1* | 2/2012 | Landers | G06F 17/2235 |
| | | | 345/473 |
| 2012/0084155 A1* | 4/2012 | Roy | G06Q 30/0273 |
| | | | 705/14.69 |
| 2012/0192226 A1* | 7/2012 | Zimmerman | H04N 21/234 |
| | | | 725/34 |
| 2012/0257842 A1* | 10/2012 | Tian | G06K 9/3233 |
| | | | 382/294 |
| 2012/0290987 A1* | 11/2012 | Gupta | G06F 17/5004 |
| | | | 715/848 |
| 2013/0141530 A1* | 6/2013 | Zavesky | H04N 21/21805 |
| | | | 348/43 |
| 2015/0113555 A1* | 4/2015 | Bonvolanta | H04N 21/4725 |
| | | | 725/32 |
| 2015/0143410 A1* | 5/2015 | Byers | H04N 21/812 |
| | | | 725/34 |
| 2016/0112729 A1* | 4/2016 | Sayed | H04N 21/23434 |
| | | | 725/10 |
| 2016/0212455 A1* | 7/2016 | Manna | G06Q 30/02 |
| 2016/0373814 A1* | 12/2016 | Kellner | H04N 21/44008 |
| 2017/0048597 A1 | 2/2017 | Silverstein | |
| 2018/0268441 A1* | 9/2018 | Triano | G06Q 30/0269 |
| 2019/0073811 A1* | 3/2019 | Shah | G06T 11/60 |

* cited by examiner

RECOGNITION AND VALUATION OF PRODUCTS WITHIN VIDEO CONTENT

BACKGROUND

The present invention relates in general to generating video content, and more specifically, to managing and editing portions of video content.

Product placement is an advertising technique used by companies to subtly promote their products through a non-traditional advertising technique, usually through appearances in film, television, or other media. Targeted advertising is a form of advertising in which online advertisers use sophisticated methods directed towards audiences with certain traits to focus on consumers who are likely to have a strong preference for a product (i.e., customers that may have more interest in a product will receive the message instead of those who have no interest and whose preferences do not match a product's attributes).

Negotiations regarding product placement and/or targeted advertising traditionally occur in pre-production before a film, television, or other media is produced. Valuations for product placement and/or targeted advertising during pre-production can be problematic due to re-shoots and editing during production.

SUMMARY

Embodiments of the invention are directed to a method for identifying one or more products, brands and/or green screen objects within video content and valuations thereof. A non-limiting example of the computer-implemented method includes receiving, by a processor, video content. The processor analyzes the video content to identify one or more products, brands and/or green screen objects within the video content. The processor further assigns a product placement score to each of the identified one or more products, brands and/or green screen objects. The processor further outputs a dataset including product placement scores assigned to each of the identified one or more products, brands and/or green screen objects, wherein the dataset provides a valuation for each of the identified one or more products, brands and/or green screen objects based on an associated product placement score.

Embodiments of the invention are directed to a computer program product that can include a storage medium readable by a processing circuit that can store instructions for execution by the processing circuit for performing a method for identifying one or more products, brands and/or green screen objects within video content and valuations thereof. The method includes receiving video content. The processor analyzes the video content to identify one or more products, brands and/or green screen objects within the video content. The processor further assigns a product placement score to each of the identified one or more products, brands and/or green screen objects. The processor further outputs a dataset including product placement scores assigned to each of the identified one or more products, brands and/or green screen objects, wherein the dataset provides a valuation for each of the identified one or more products, brands and/or green screen objects based on an associated product placement score.

Embodiments of the invention are directed to a system. The system can include a processor in communication with one or more types of memory. The processor can be configured to receive video content. The processor can be further configured to analyze the video content to identify one or more products, brands and/or green screen objects within the video content. The processor can be further configured to assign a product placement score to each of the identified one or more products, brands and/or green screen objects. The processor can be further configured to a dataset including product placement scores assigned to each of the identified one or more products, brands and/or green screen objects, wherein the dataset provides a valuation for each of the identified one or more products, brands and/or green screen objects based on an associated product placement score.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter that is regarded as the invention is particularly pointed out and distinctly claimed in the claims at the conclusion of the specification. The foregoing and other features and advantages of the invention are apparent from the following detailed description taken in conjunction with the accompanying drawings in which:

Figure 1:
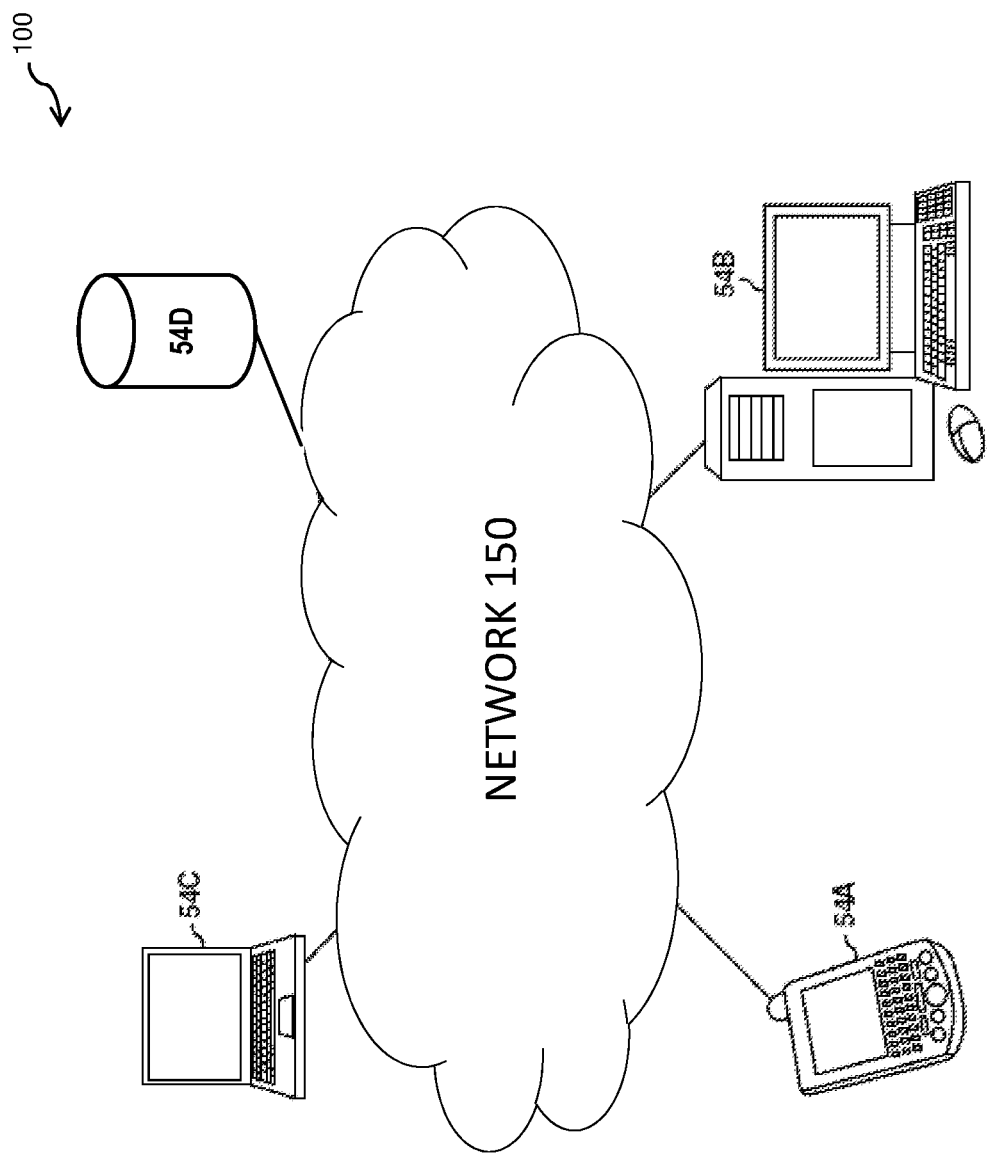
FIG. 1 is a diagram illustrating an exemplary operating environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, which are related to advertising within video content. Product placement and/or targeted marketing in video content can drive revenue for companies by subtly advertising their products within the video content.

Agreements regarding advertising (i.e., product placement and/or targeted marketing) within video content typically occur in pre-production; however, such agreements can be problematic because how and where products have been placed, as well as how products are portrayed in a final product of the video content can differ from the terms agreed due to editing or other production considerations. Unfortunately, few changes to the video content can occur once the video content is shot (post-production) to address discrepancies with the agreed terms. Moreover, valuations for selling product placement in video content are difficult, especially in instances where changes are desired in post-production.

Accordingly, locating products that exist in video content after productions occur and determining where products can be inserted into video content (e.g., television, movies, streaming services, etc.) in post-production is needed. In addition, determining a product placement score for each location based on criteria such as screen time, lighting, visual focal points which can be used to sell advertisements in the video content, determine whether additional editing or re-shoots are needed or determine what products can be replaced in post-production would be beneficial. Hence, a solution that allows for video content creators and advertisement companies to more fully understand the value of where and how products are represented in video content, as well as an ability to make changes to the video content in post-production to address issues between video content creators and advertisement companies would be useful for creating a final version of the video content.

The above-described aspects of the invention address the shortcomings of the prior art by creating and utilizing a product placement score output dataset which can be used by video content creators to sell targeted advertising space within recorded video content. In addition, areas within the video content not being utilized can be identified for possible product placement in post-production. Accordingly, products in video content can be better valued for discussions regarding advertising.

FIG. 1 is a block diagram illustrating an operating environment 100 according to one or more embodiments of the present invention. The environment 100 can include one or more computing devices, for example, personal digital assistant (PDA) or cellular telephone (mobile device) 54A, server 54B, computer 54C, and/or storage device 54D which are connected via network 150. The one or more computing devices may communicate with one another using network 150. Storage device 54D can include network attached and/or remote storage.

Network 150 can be, for example, a local area network (LAN), a wide area network (WAN), such as the Internet, a dedicated short-range communications network, or any combination thereof, and may include wired, wireless, fiber optic, or any other connection. Network 150 can be any combination of connections and protocols that will support communication between mobile device 54A, server 54B, computer 54C, and/or storage device 54D respectively.

Figure 2:
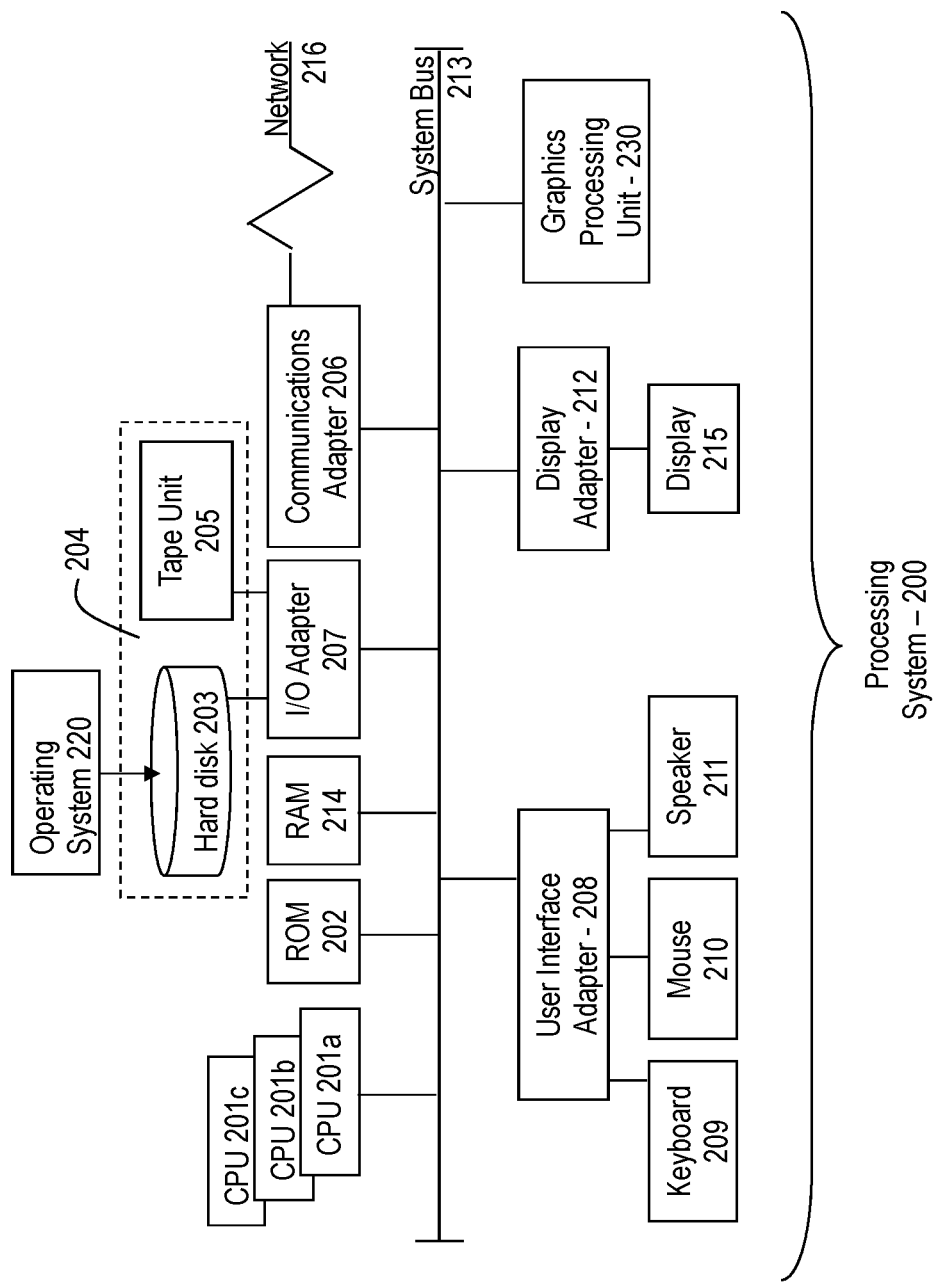
FIG. 2 is a block diagram illustrating one example of a portion of the processing system one or more computing devices described in FIG. 1 for practice of the teachings herein.

Referring to FIG. 2, there is shown an embodiment of a processing system 200 for implementing the teachings herein. The processing system 200 can form at least a portion of one or more computing devices, mobile device 54A, server 54B, computer 54C and storage device 54D. In this embodiment, the processing system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of the processing system 200.

FIG. 2 further depicts an input/output (I/O) adapter 207 and a network adapter 206 coupled to the system bus 213.

I/O adapter 207 may be a small computer system interface (SCSI) adapter that communicates with a hard disk 203 and/or tape storage drive 205 or any other similar component. I/O adapter 207, hard disk 203, and tape storage device 205 are collectively referred to herein as mass storage 204. Operating system 220 for execution on the processing system 200 may be stored in mass storage 204. A network adapter 206 interconnects bus 213 with an outside network 216 enabling data processing system 200 to communicate with other such systems. A screen (e.g., a display monitor) 215 can be connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A keyboard 209, mouse 210, and speaker 211 can all be interconnected to bus 213 via user interface adapter 208, which may include, for example, a Super I/O chip integrating multiple device adapters into a single integrated circuit.

In exemplary embodiments, the processing system 200 includes a graphics-processing unit 230. Graphics processing unit 230 is a specialized electronic circuit designed to manipulate and alter memory to accelerate the creation of images in a frame buffer intended for output to a display. In general, graphics-processing unit 230 is very efficient at manipulating computer graphics and image processing, and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as keyboard 209 and mouse 210, and output capability including speaker 211 and display 215. In one embodiment, a portion of system memory 214 and mass storage 204 collectively store an operating system to coordinate the functions of the various components shown in FIG. 2.

Figure 3:
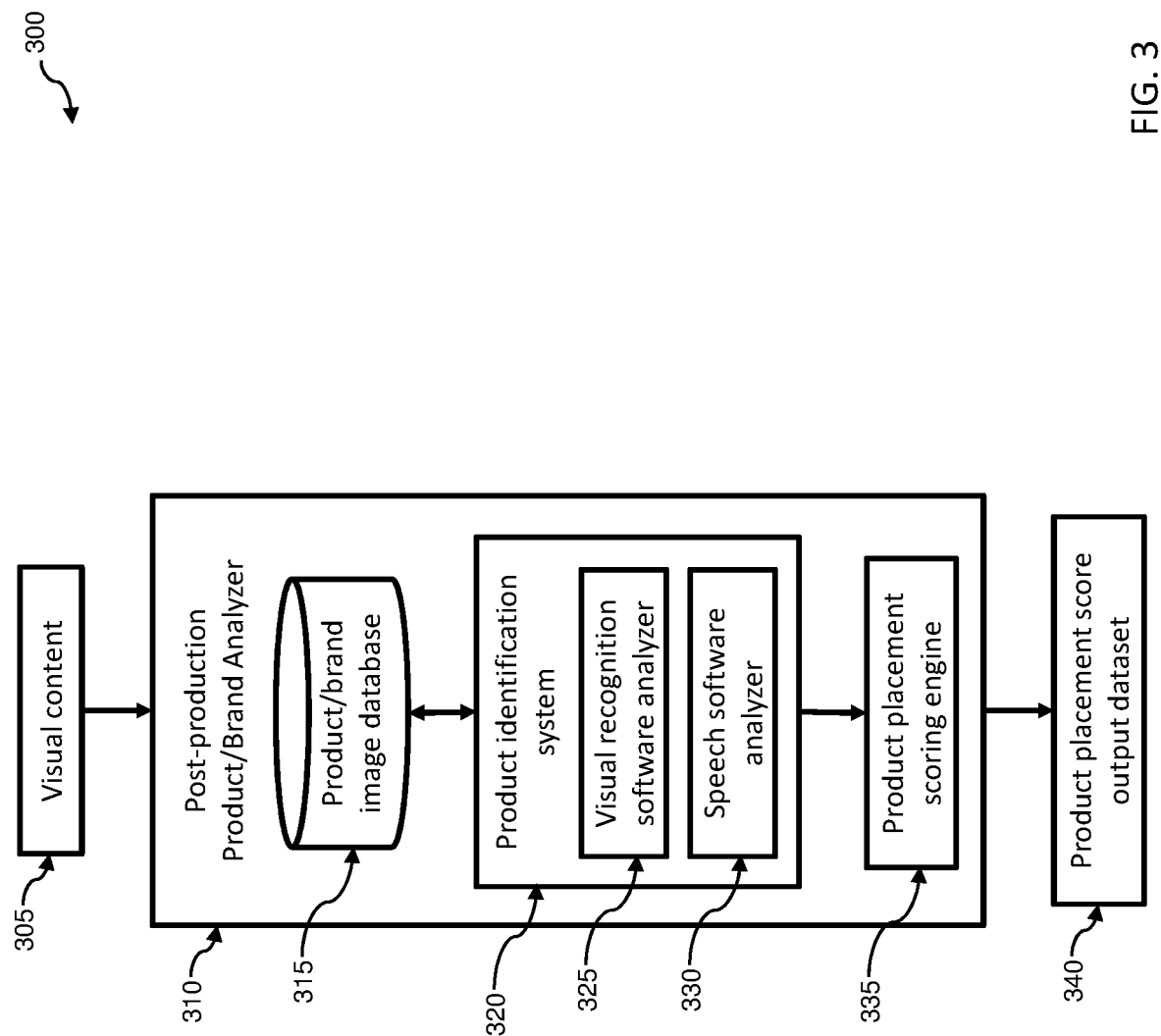
FIG. 3 is a block diagram illustrating a computing system according to one or more embodiments of the present invention.

Referring now to FIG. 3, there is illustrated a computing system 300 in accordance with one or more embodiments of the invention. As illustrated, the computing system 300 can include, but is not limited to, a post-production product/brand analyzer 310. The post-production product/brand analyzer 310 can be used to analyze video content 305 received by the post-production product/brand analyzer 310 in order to determine products, product locations and useful locations within the video content 305 which can be used to generate a product placement scoring dataset for the video content 305.

The post-production product/brand analyzer 310 can also include a product/brand image database 315. The product/brand image database 315 can store a plurality of images, 3D models, generic models, etc., of shapes or objects that may be associated with products or brands within the video content 305. The stored images can be used for comparison with products within the video content 305.

The post-production product/brand analyzer 310 can also include a product identification system 320, which can be made up of, for example, a visual recognition software analyzer 325 and speech software analyzer 330. The product identification system 320 can use the visual recognition software analyzer 325 to identify products within the video content 305 using, for example, video recognition software (ex., IBM Watson® Video Recognition API). The visual recognition software of the visual recognition software analyzer 325 may also extract, from the video content 305, a context associated with the identified product or brand (e.g., was a baseball bat used for the game winning hit or to commit a crime). The visual recognition software of the visual recognition software analyzer 325 may also identify "green screen" objects that were purposely left unbranded during recording video content 305 which may be subsequently replaced later should a location associated with the green screen object be purchased by an advertiser. Herein, "green screen" objects may refer to areas in a scene in which a visual effects/post-production technique for compositing (layering) two images or video streams together based on color hues (chroma range) will be employed, but may also refer in general to potential areas, voids or locations of objects with non-relevant information (e.g., a billboard located in the background of a scene) within a scene that have been identified as locations to potentially add products or brands during post-production.

The product identification system 320 can use the speech software analyzer 330 to identify speech associated with products within the video content 305 using, for example, speech analysis software (ex., Watson™ Speech to Text API, Natural Language API, AlchemyLanguage API, Tone Analyzer API, etc.). Accordingly, audio associated with the video content 305 can be converted from speech to text. The text can be searched to determine whether brand names are spoken within the video content 305, along with any associated brand slogans or trademarked terms.

The post-production product/brand analyzer 310 can also include a product placement scoring engine 335. Upon identifying products and green screen objects, visually and/or audibly, within the video content 305, a valuation can be associated with each of the identified product and green screen object identified in the video content 305. Using a combination of audio and video data associated with the identified products and green screen objects, a product placement score can be given to an identified product location. The valuation can be based on a product placement score assigned to the identified product location generated by the product placement scoring engine 335.

Factors that may affect the product placement score generated by the product placement scoring engine 335 for an identified product or green screen object can include a duration of time the identified product or green screen object is displayed (i.e., screen time), a size of brand placement or green screen space in comparison to an entire viewing screen, a location of the identified product or green screen object within the viewing screen (i.e., will viewers of the content 305 be drawn to the location of the identified product or green screen object depending upon what is happening within a scene or is the identified product or green screen object being held by an actor or between two actors on the viewing screen), has at least a portion of the identified product or green screen object been obscured by other objects or cut off within the viewing screen, a context associated with how the identified product was used in the video content 305 (ex, a baseball bat used for the game winning hit will positively affect the product placement score, whereas a baseball bat used to commit a crime may negatively affect the product placement score), post-processing work that would be required to replace the identified product if the identified product is moving in a scene, whether within the video content 305, actors talk about an identified product without specifically mentioning it by name (ex, "that was refreshing" after taking a drink may positively impact the product placement score, whereas "that tastes awful" after taking a bite of food may negatively impact the product placement score), and if an identified product was mentioned by name, the product placement score may be impacted (ex, the identified product that is mentioned by an actor on screen may be difficult to replace and require Automated Dialogue Replacement (ADR) from an actor, but if the actor is not on screen, replacing the identified may be easier.

Upon scoring individual products and green screen objects within the video content 305, the post-production product/brand analyzer 310 can generate and output a dataset 340 which can be used by video content creators to sell targeted advertising space more easily for previously recorded video content. The dataset 340 may include brands/products, product placement scores, locations, timestamps, visual information (e.g., size, color, shading, etc.), and audio information (e.g., product mentioned by name, what was said about a product, etc.).

The video content creators can also use the dataset 340 to identify which products may be specific to a particular locale (ex, the United States) which may not be relevant or useful, from an advertising perspective, if the video content 305 was aired in a different locale (ex, Singapore). Accordingly, the video content creators can attempt to replace the identified products with products associated with a given locale by selling the advertising space associated with the identified products.

Also, for advertising space already sold in the video content 305, the dataset 340 may be used to confirm that the products have been included in the video content 305 as agreed. For example, an advertiser may agree with a video content creator to include a product for a certain price, as long as the product has a certain product placement score in a final version of the video content 305. At various stages of production, the video content creator can confirm the agreed product placement score for the advertised product within the video content 305. If the product placement score for the product is below what was agreed, the product can be flagged and the video content creator can perform a re-shoot of a scene associated with the advertised product.

Figure 4:
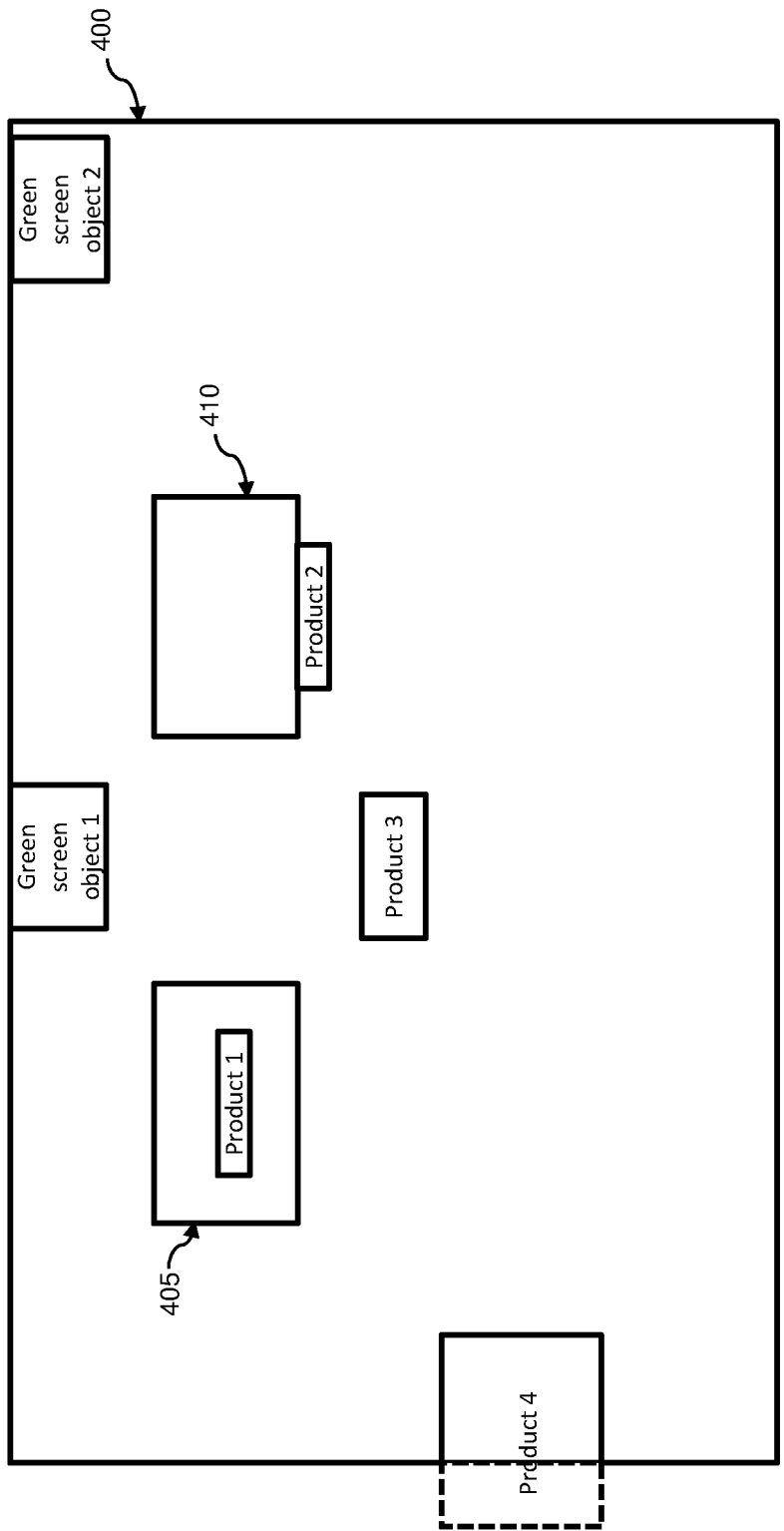
FIG. 4 is a diagram illustrating an exemplary scene having products and green screen objects according to one or more embodiments of the present invention.

FIG. 4 is a diagram illustrating an exemplary scene 400 of video content 305 including a plurality of products and green screen objects according to one or more embodiments of the present invention. In scene 400, an actor 405 may be conversing with actor 410. Actor 405 may be wearing a t-shirt including a logo of Product 1. Actor 410 may be holding Product 2. Product 3 may be located between actor 405 and actor 410. A portion of product 4 may be located outside of scene 400. Scene 400 may also include green screen object 1 and green screen object 2.

When scene 400 is input into the post-production product/brand analyzer 310, the post-production product/brand analyzer 310 can indicate via a product placement score that the logo of Product 1 located on the t-shirt of actor 405 is a candidate for post-production replacement. While advertising Product 1 may be appropriate for a given market or country, advertising Product 1 in other markets or countries may not be beneficial to advertisers. Accordingly, the video content creator may create a valuation for advertising Product 1 in one or more agreed markets and/or countries, and advertise other products in other markets and/or countries.

The product placement score can be in consideration of the fact that the eyes of the viewers will be drawn to the actor. The product placement score may be lowered if actor moves a lot making viewing of Product 1 difficult.

Because actor 410 is holding Product 2, the eyes of the viewers may be drawn to Product 2, especially if brand is easily readable. Accordingly, the product placement score would increase due to location of Product 2 within scene 400. If Product 2 is mentioned by actor 410, the product placement score may be reduced due to the difficulty of replacing the product because the actor's speech within the video content would need to be altered to remove the mention of Product 2. The eyes of the viewers may be drawn to Product 3 because Product 3 is located between actor 405 and actor 410. Accordingly, depending on how Product 3 is presented will affect the product placement score. The product placement score of Product 4 may be affected by the fact that a portion of Product 4 is not viewable within scene 400.

While green screen object 1 and green screen object 2 did not include any product placements within scene 400, the post-production product/brand analyzer 310 may analyze green screen object 1 and green screen object 2 to determine whether green screen object 1 and green screen object 2 would be useful as targeted advertising space within a final version of video content 305. For example, green screen object 1 may be useful as a target advertising space due to green screen object 1 being location between actor 405 and actor 410. Accordingly, the product placement score for green screen object 1 will be in consideration of the location of green screen object 1 in relation to actor 405 and actor 410. The product placement score for green screen object 2 will be affected by the fact that green screen object 2 is located away from actor 405 and actor 410.

Figure 5:
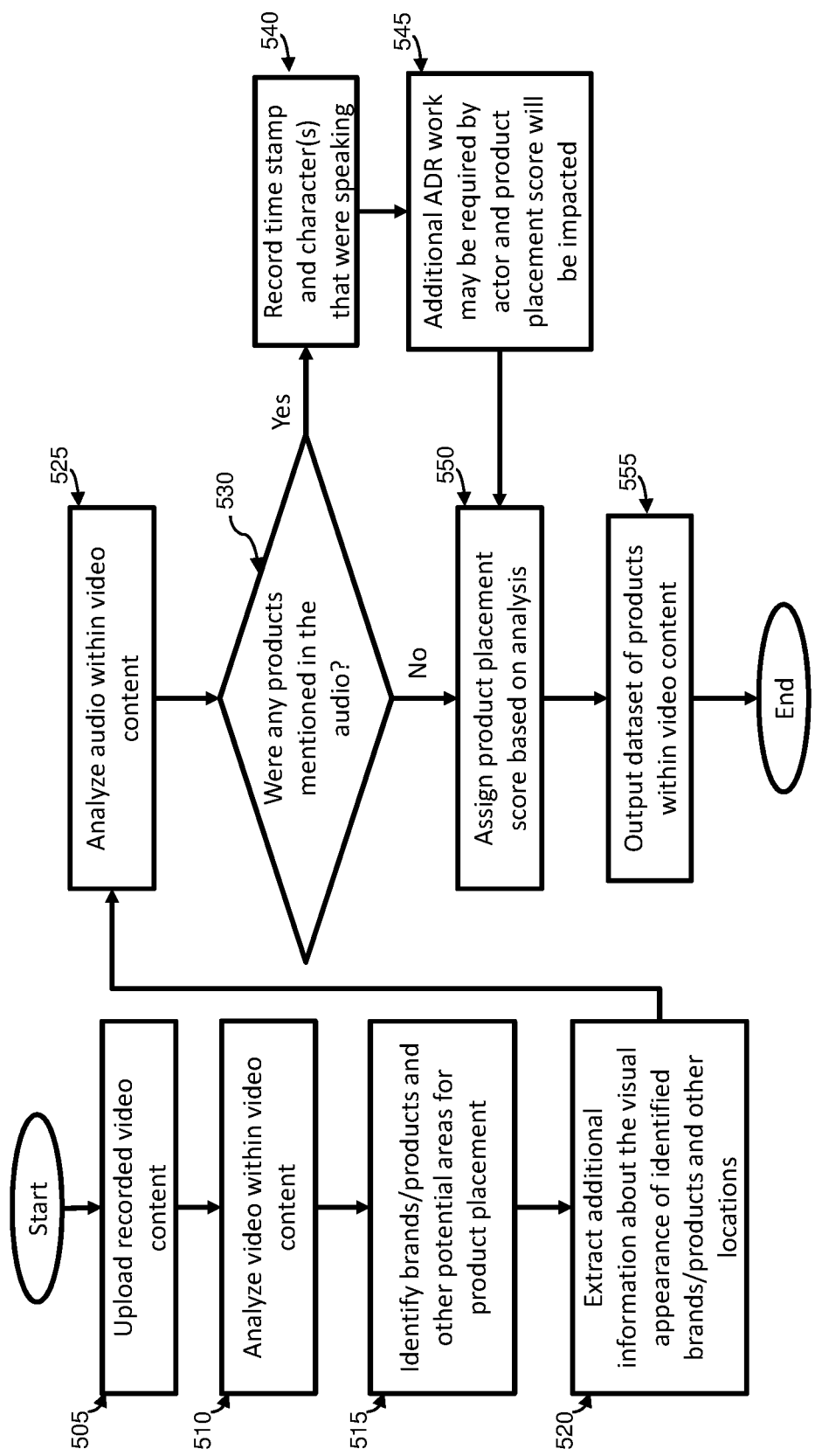
FIG. 5 is a flow diagram illustrating a method for identifying one or more products, brands and/or green screen objects within video content and valuations thereof in accordance with one or more embodiments of the present invention.

FIG. 5 is a flow diagram illustrating a method for identifying one or more products, brands and/or green screen objects within video content and valuations thereof according to one or more embodiments of the present invention. At block 505, video content that has been recorded is uploaded into a post-production product/brand analyzer to determine relevant products and/or green screen objects that may be useful in advertising products with the video content. At block 510, the video content is analyzed using, for example, video recognition software. At block 515, based on the visual analysis, products, brands and/or green screen objects within the video content are identified. At block 520, additional information for each of the identified products, brands and/or green screen objects within the video content may be extracted. For example, additional information may be related to location information, duration on screen, whether the identified products was created using computer-generated imagery (CGI), color, shading, size or the like.

At block 525, audio associated with the video content is analyzed using, for example, speech analysis software. At block 530, the post-production product/brand analyzer can determine whether any of the identified products and/or brands have been referred to within audio associated with the video content. If identified products and/or brands have been referred to within audio associated with the video content, the method proceeds to block 540, where a time stamp is associated with the products and/or brands, and any characters referring to the products and/or brands are identified. At block 545, the post-production product/brand analyzer can determine whether ADR will be needed to replace the products and/or brands and adjust a product placement score for the associated products and/or brands accordingly (e.g., the product placement score will be reduced when ADR is required). The method would then proceed to block 550.

If identified products and/or brands have not been referred to within audio associated with the video content, the method proceeds to block 550, where each of the identified products, brands and/or green screen objects within the video content is assigned a product placement score. As mentioned above, a variety of factors may affect the product placement score for a given product, brand and/or green screen object. At block 555, the product placement scores of the products, brands and/or green screen objects within the video content are aggregated into a dataset. The output dataset may be used by the video content creator and/or one or more advertisers to assign a value/cost to an advertising space within the video content, ensure agreed upon terms for a product advertisement within the video content is in compliance, determine whether a scene re-shoot is required, determine which products and/or brands can be replaced based on locale, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for identifying one or more products, brands and/or green screen objects within video content and valuations thereof, the method comprising:
   receiving, by a processor, video content;
   analyzing, by the processor, the video content to identify one or more products, brands and/or green screen objects within the video content;
   assigning, by the processor, a product placement score to each of the identified one or more products, brands and/or green screen objects, wherein the product placement score for each of the product, brand and/or green screen object is based on a screen time duration and location of each of the product, brand and/or green screen object in the video content;
   modifying, by the processor, the product placement score for a first object of the identified one or more products, brands and/or green screen objects based on determining a positive context or a negative context of a use of the first object in the video content;
   outputting, by the processor, a dataset including product placement scores assigned to each of the identified one or more products, brands and/or green screen objects, wherein the dataset provides a valuation for each of the identified one or more products, brands and/or green screen objects based on an associated product placement score; and
   modifying the video content to replace the first object of the one or more products, brands and/or green screen objects with a second object.

2. The computer-implemented method of claim 1, wherein the video content is analyzed using a visual analysis to identify one or more products, brands and/or green screen objects within the video content.

3. The computer-implemented method of claim 1, wherein the video content is analyzed using an audio analysis to identify one or more products, brands and/or green screen objects within the video content.

4. The computer-implemented method of claim 3, further comprising using the audio analysis to determine that one or more products, brands and/or green screen objects identified using visual analysis has been referred to within the video content.

5. The computer-implemented method of claim 1, further comprising:
   obtaining an agreed product placement score for a first product of the one or more products, brands, and/or green screen objects; and
   based on a determination that the product placement score for the first product is below the agreed product placement score, flagging the first product for a re-shoot of one or more scenes including a placement of the first product.

6. The computer-implemented method of claim 1, wherein the replacement one or more of the identified one or more products, brands and/or green screen objects within the video content is in response to a change in advertising locale.

7. The computer-implemented method of claim 1, wherein a green screen object is associated with locations within the video content that are not associated with a product and/or brand when the video content is analyzed.

8. A computer program product for identifying one or more products, brands and/or green screen objects within video content and valuations thereof, the computer program product comprising:
   a non-transitory computer readable storage medium having stored thereon first program instructions executable by a processor to cause the processor to:
   receive video content;
   analyze the video content to identify one or more products, brands and/or green screen objects within the video content;
   assign a product placement score to each of the identified one or more products, brands and/or green screen objects, wherein the product placement score for each of the product, brand and/or green screen object is based on a screen time duration and location of each of the product, brand and/or green screen object in the video content;
   modifying, by the processor, the product placement score for a first object of the identified one or more products, brands and/or green screen objects based on determining a positive context or a negative context of a use of the first object in the video content;
   output a dataset including product placement scores assigned to each of the identified one or more products, brands and/or green screen objects, wherein the dataset provides a valuation for each of the identified one or more products, brands and/or green screen objects based on an associated product placement score; and
   modifying the video content to replace the first object of the one or more products, brands and/or green screen objects with a second object.

9. The computer program product of claim 8, wherein the video content is analyzed using a visual analysis to identify one or more products, brands and/or green screen objects within the video content.

10. The computer program product of claim 8, wherein the video content is analyzed using an audio analysis to identify one or more products, brands and/or green screen objects within the video content.

11. The computer program product of claim 10, further comprising using the audio analysis to determine that one or more products, brands and/or green screen objects identified using visual analysis has been referred to within the video content.

12. The computer program product of claim 8, wherein the replacement one or more of the identified one or more products, brands and/or green screen objects within the video content is in response to a change in advertising locale.

13. The computer program product of claim 8, wherein a green screen object is associated with locations within the video content that are not associated with a product and/or brand when the video content is analyzed.

14. A system comprising:
   a storage medium coupled to a processor;
   the processor configured to:
   receive video content;

analyze the video content to identify one or more products, brands and/or green screen objects within the video content;

assign a product placement score to each of the identified one or more products, brands and/or green screen objects, wherein the product placement score for each of the product, brand and/or green screen object is based on a screen time duration and location of each of the product, brand and/or green screen object in the video content;

modifying, by the processor, the product placement score for a first object of the identified one or more products, brands and/or green screen objects based on determining a positive context or a negative context of a use of the first object in the video content;

output a dataset including product placement scores assigned to each of the identified one or more products, brands and/or green screen objects, wherein the dataset provides a valuation for each of the identified one or more products, brands and/or green screen objects based on an associated product placement score; and modifying the video content to replace the first object of the one or more products, brands and/or green screen objects with a second object.

15. The system of claim 14, wherein the video content is analyzed using a visual analysis to identify one or more products, brands and/or green screen objects within the video content.

16. The system of claim 14, wherein the video content is analyzed using an audio analysis to identify one or more products, brands and/or green screen objects within the video content.

17. The system of claim 16, further comprising using the audio analysis to determine that one or more products, brands and/or green screen objects identified using visual analysis has been referred to within the video content.

\* \* \* \* \*